3,297,672
POLYMERIZATION OF ALLYL CYCLOHEXANE
WITH A FRIEDEL-CRAFTS CATALYST
Arthur Donald Ketley, Olney, and Raymond J. Ehrig,
Silver Spring, Md., assignors to W. R. Grace & Co.,
New York, N.Y., a corporation of Connecticut
No Drawing. Filed Aug. 9, 1963, Ser. No. 301,207
15 Claims. (Cl. 260—93.1)

This invention relates to novel polymer compositions and a process for producing same. More particularly this invention is concerned with polymerizing olefins of the formula:

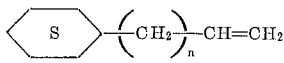

where $n$ is an integrer from 0 to 3.

It is known in the art to polymerize olefins of the formula:

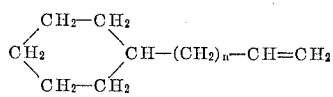

where $n$ is an integer from 0 to 3, by subjecting said olefins to the action of a Ziegler type catalyst at temperatures in the range 20 to 100° C. The polymeric product obtained has the recurring structural unit

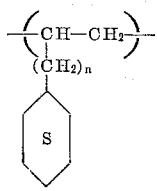

where $n$ is as defined above. See K. R. Dunham, J. Van Den Berghe, J. W. H. Faber and L. E. Contois, J. Polymer Sci. (A) 1, 751 (1963).

Surprisingly it has now been discovered that where an olefin of the formula,

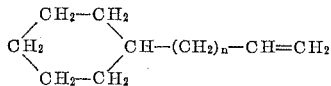

wherein $n$ is an integer from 0 to 3 inclusive, is subjected to the action of a Friedel-Crafts catalyst in the presence of a cocatalyst selected from the group consisting of a donor proton source (e.g. any Bronsted acid or water) and a carbonium ion source, preferably but not necessarily in an inert solvent at a temperature in the range minus 30 to minus 150° C., the polymer product obtained contains predominantly the recurring structural unit,

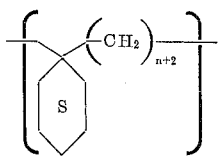

where $n$ is an integer from 0 to 3, said integer being the same integer as in the olefin monomer reactant.

The cyclohexyl group attached to the terminal carbon atom in the monomers employed as reactants in the instant invention may, if desired, be substituted with alkyl groups as will be shown by an example hereinafter. Thus such monomers as 1-isopropyl-4-vinyl cyclohexane; 1-methyl - 4 - alkyl cyclohexane; 1 - phenyl - 4 - vinyl cyclohexane; 1-(2,4-dimethylcyclohexyl)-vut-4-ene-1 and 5-vinyl-2,4-bicyclooctane and the like are operable to yield the novel polymer structures of this invention due to the rate of carbonium ion rearrangement being faster than the propagation rate under the conditions of this invention. Other substituents, aside from alkyl groups, may be placed on the cyclohexyl ring and result in novel-polymers without affecting the reaction as long as said substituents do not complex with or otherwise destroy the Friedel-Crafts catalyst. Hence the criticality of substituent selection is whether or not the substituent complexes or destroys the Friedel-Crafts catalyst. Such a selection is obvious to one skilled in the art.

At the low reaction temperatures of this cationic polymerization the rate of carbonium ion rearrangement is faster than the rate of propagation. For example in polymerizing vinyl cyclohexane the secondary carbonium ion, which is the propagating end, rearranges to a tertiary carbonium ion by a 3,2-hydride shift prior to propagation of the polymer chain. This results in a polymer having predominantly the following recurring structural unit:

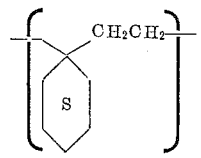

In the ordinary case of polymerizing vinyl cyclohexane with a Ziegler catalyst at temperatures from 20 to 100° C. the resulting polymer has exclusively the following recurring structural unit:

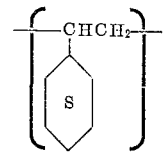

Thus it is seen that a novel polymer composition is formed by the practice of this invention.

One method of determining the recurring structural unit in the resultant polymer product is by the use of infrared spectroscopy.

The normal Ziegler-Natta polymers of these cyclohexyl monomers have only one methylene group per monomer unit in the backbone. The Friedel-Crafts polymers have two or more methylene groups. This gives rise to significant differences between the spectra of the two sets of polymers in the methylene rocking region of the infrared i.e. (700 cm.$^{-1}$–800 cm.$^{-1}$). For example, the band at 752 cm.$^{-1}$ in cationic poly-3-methylbutene-1 has been assigned to the skeletal rocking mode of the $\{CH_2CH_2\}$ group. See J. P. Kennedy, J. Polymer Sci. (in press 1963). This band is completely absent in the Ziegler-Natta polymer. A similar assignment has been made by Van Schooten and Mostert for this band in ethylene-propylene copolymers. See Polymer, 4, 135 (1963). The same workers assign a band at 730 cm.$^{-1}$ to $\{CH_2\}_3$ sequences. Methylene rocking vibrations in side-chains and end-groups have somewhat higher frequencies; for example, the $\{CH_2CH_2CH_2\}$ in the terminal propyl group of polypropylene absorbs at 740 cm.$^{-1}$. See M. C. Harvey and A. D. Ketley, J. App. Polymer Sci., 34, 533 (1959), while bands at 700–770 cm.$^{-1}$ have been assigned to the $\{CH_2\}_2$ group in the side-chains of several polymers.

The infrared absorptions in the methylene rocking region of polymers prepared with Friedel-Crafts catalysts are shown in Table I together with assignments of these bands.

TABLE I.—METHYLENE ROCKING ABSORPTIONS OF POLYCYCLOHEXYL ALKENES PREPARED WITH FRIEDEL-CRAFTS CATALYSTS

| Compound | I.R. Absorption, cm.$^{-1}$ | Assignment |
| --- | --- | --- |
| Polyvinylcyclohexane | 740–745 | $-(CH_2CH_2)-$ |
| Polyallylcyclohexane | 725 | $-(CH_2CH_2CH_2)-$ |
| Poly-4-cyclohexylbutene-1 | 723 | $-(CH_2)_4-$ |
| Poly-5-cyclohexylpentene-1 | 721 | $-(CH_2)_5-$ |

The positions of these methylene rocking bands support the structures proposed for these polymers.

The following examples are set down to aid in understanding but expressly not to limit the invention. Unless otherwise specified all parts and percentages herein are by weight.

*Example 1*

1.0 gm. AlBr$_3$ catalyst was dissolved in 250 ml. of ethyl chloride and cooled to minus 50° C. The cooled catalyst solution was charged under nitrogen to a 1 liter nitrogen-purged resin kettle equipped with stirrer, thermometer, Dry Ice condenser and gas inlet and containing 18.9 gms. of vinyl cyclohexane. The kettle was maintained at a temperature of minus 80° C. by a low temperature bath. After a reaction period of 20 minutes under nitrogen with agitation, polymer was noticeable. The reaction was continued for 3 hours after which 20 cc. methanol was added to stop the reaction. The polymer product was washed, ground, filtered and dried overnight in a vacuum oven. The dried polymer weighed 6.8 gms. (36% monomer conversion), had a softening point of 93° C., and a number average molecular weight of 10,500. On characterization by infrared spectroscopy a sample showed a sharp band at 742 cm.$^{-1}$. Such absorption is characteristic of the $-(CH_2)_2-$ group in

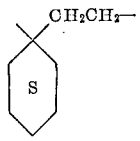

A control run was made using polymer obtained from polymerizing vinyl cyclohexane in the presence of a Ziegler catalyst in heptane solvent at a temperature of 55° C. and a pressure of 1 atm. The Ziegler catalyzed polymer showed no infrared absorption in the region 700–800 cm.$^{-1}$ in agreement with the accepted structure

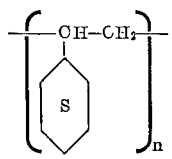

*Example 2*

28 ml. ethyl chloride containing 0.25 g. AlBr$_3$ were condensed under a N$_2$ atmosphere in a 50 ml. nitrogen purged flask equipped with stirrer, thermometer, Dry Ice condenser and gas inlet. The kettle was maintained at a temperature of −113° C. by immersing it in a cooling bath. Under nitrogen, 5 ml. of vinyl cyclohexane previously dried over CaH$_2$ was added to the flask in 25 ml. ethyl chloride at −113° C. The reaction, with agitation, was continued under N$_2$ for 3 hours. Excess methanol was added to the kettle to stop the reaction. The polymer was then ground in fresh methanol, filtered and dried overnight in a vacuum oven at 25° C. The dried polymer product (0.3 gm.) was a glassy material having a number average molecular weight of 12,700 determined in benzene solutions using a Mechrolab vapor pressure osmometer. On characterization by infrared spectroscopy the polymer had the recurring structural unit:

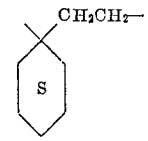

and had a softening point of 120° C.

*Example 3*

Example 2 was repeated except that 5 ml. of allyl cyclohexane was substituted for vinyl cyclohexane. The resulting polymer product on characterization by IR was predominantly a polymer having the following recurring structural unit:

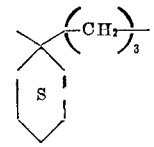

and had a number average molecular weight of 13,100 and a softening point of 90° C.

*Example 4*

Example 2 was repeated except that 4 ml. of 4-cyclohexyl butene-1 was substituted for vinyl cyclohexane. The resulting polymer product on characterization by IR was predominantly a polymer having the following recurring structural unit:

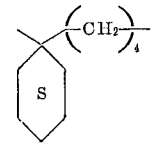

and had a number average molecular weight of 7200.

*Example 5*

Example 2 was repeated except that 5 ml. of cyclohexyl pentene-1 was substituted for vinyl cyclohexane. The resulting polymer product on characterization by IR was predominantly a polymer having the following recurring structural unit:

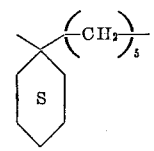

The polymer was a rubbery material, having a glass transition temperature of 0° C. and a number average molecular weight of 4450.

*Example 6*

Example 2 was repeated except that 5 ml. of 1-isopropyl-4-vinyl cyclohexane was substituted for vinyl cyclohexane. The resulting polymer product on characterization by IR was predominantly a glassy polymer having the following recurring structural unit:

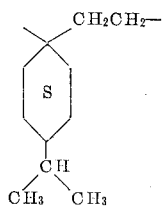

The polymer product had a number average molecular weight of 10,600 and a softening point of 110° C.

The polymerization reaction is performed at a temperature in the range minus 30° to minus 150° C. At higher temperatures the rate of propagation is faster than the rate of rearrangement via the hydride shift thus resulting in predominantly unrearranged, low molecular weight polymer products.

Preferably solutions containing from 1–10% by weight of monomer are used. Any solvent in which the monomer dissolves and preferably in which the polymer formed precipitates and which remains liquid under the reaction conditions is operable. Obviously the solvent must also be one which does not react with or "kill" the catalyst. A preferred class of solvents includes but is not limited to chlorinated hydrocarbons. Example of said preferred class of solvents include methyl chloride, butyl chloride, ethyl chloride and the like. Saturated hydrocarbons such as butane, propane and pentane are also operable as solvents in the instant invention. Other well known solvents are obvious to one skilled in the art.

As used herein the term Friedel-Crafts catalyst means any Lewis Acid capable of initiating cationic, that is, carbonium ion type polymerization. Examples of Friedel-Crafts catalyst include, but are not limited to, $AlCl_3$ $AlBr_3$, $BF_3$, $SnCl_4$.

The amount of Friedel-Crafts catalyst used in this invention can be varied within wide limits. A monomer: Friedel-Crafts catalyst weight ratio in the range 100:1– 1:1 is operable in performing this invention.

The polymerization reaction is performed in the presence of a co-catalyst selected from the group consisting of a proton donor and a carbonium ion source. Examples of operable proton donors include, but are not limited to, water and any Bronsted acid. Alkyl halides are one type of carbonium ion source operable in this invention. Where an alkyl halide is used as the solvent as in Example 2 herein, no additional co-catalyst is necessary. When an inert saturated hydrocarbon, e.g. butane is used as the solvent in the instant invention, normal drying procedures leave sufficient moisture in the solvent to act as a proton donor co-catalyst. Nor is the donor proton or carbonium ion source co-catalyst concentration critical. The invention is operable with amounts ranging from a trace, e.g. 0.01% by weight of the Friedel-Crafts catalyst concentration up to amounts in great excess over the amount of Friedel-Crafts catalyst employed as evidenced by the use of ethyl chloride as co-catalyst and solvent in Example 1.

The polymer products of the instant invention have many and varied uses. The polymer products due to the rearrangement by means of the hydride shift are glassy materials. Thus the polymer products can be used in any application where a highly transparent, hard polymer is required. Such uses include clear containers, rear lights for autos, decorative mouldings, etc.

The softening point of the polymer products of the instant invention was measured as the temperature at which the polymer begins to flow on a Fisher John's melting block.

The number average molecular weight of the polymer products of this invention were measured on a Mechrolab vapor pressure osmometer, Model 301–A manufactured by Mechrolab Inc., Mountain View, California, in accord with the instructions therefor.

The glass transition temperature of the glassy polymer products of this invention is defined as the point where the thermal expansion coefficient undergoes a discontinuity as measured by dilatometry in accord with the method of Bekkedahl, N.; J. Research, Natl. Bur. Standards, 43, 145 (1949).

The IR spectra of the polymer products of the instant invention were obtained with a Perkin-Elmer 21 IR spectrometer using solid films of the polymer, 0.5–1 mil in thickness.

What is claimed is:

1. A solid glassy type polymer having predominantly the following recurring structural unit

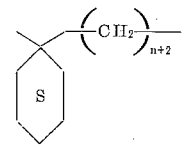

where

is a cyclohexyl group and $n$ is an integer from 0 to 3 inclusive.

2. A solid glassy type polymer having predominantly the following recurring structural unit

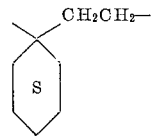

3. A solid glassy type polymer having predominantly the following recurring structural unit

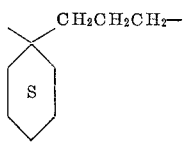

4. A solid glassy type polymer having predominantly the following recurring structural unit

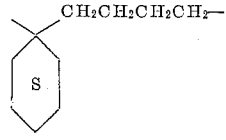

5. A polymerization process which comprises subjecting an olefin of the formula:

where

is a cyclohexyl group and $n$ is an integer from 0 to 3 inclusive, to the action of a Friedel-Crafts catalyst and a co-catalyst selected from the group consisting of a proton donor source and a carbonium ion source at a temperature in the range minus 30 to minus 150° C.

6. The process according to claim 5 wherein the polymerization reaction is performed in a solvent.

7. A polymerization process which comprises subjecting vinyl cyclohexane to the action of a Friedel-Crafts catalyst and a co-catalyst selected from the group consisting of a proton donor source and a carbonium ion source at a temperature in the range minus 30 to minus 150° C.

8. The process according to claim 7 wherein the polymerization reaction is performed in a solvent.

9. A polymerization process which comprises subjecting allyl cyclohexane to the action of a Friedel-Crafts catalyst and a co-catalyst selected from the group consisting of a proton donor source and a carbonium ion source at a temperature in the range minus 30 to minus 150° C.

10. The process according to claim 9 wherein the polymerization reaction is performed in a solvent.

11. A polymerization process which comprises subjecting 4-cyclohexylbutene-1 to the action of a Friedel-Crafts catalyst and a co-catalyst selected from the group consisting of a proton donor source and a carbonium ion source at a temperature in the range minus 30 to minus 150° C.

12. A polymerization process which comprises subjecting 5-cyclohexylpentene-1 to the action of a Friedel-Crafts catalyst and a co-catalyst selected from the group consisting of a proton donor source and a carbonium ion source at a temperature in the range minus 30 to minus 150° C.

13. The process according to claim 11 wherein the polymerization reaction is performed in a solvent.

14. A solid glassy type polymer having predominantly the following recurring structural unit

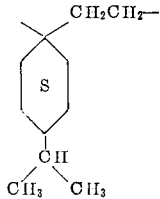

15. A polymerization process which comprises subjecting 1-isopropyl-4-vinyl cyclohexane to the action of a Friedel-Crafts catalyst and a co-catalyst selected from the group consisting of a proton donor source and a carbonium ion source at a temperature in the range minus 30 to minus 150° C.

References Cited by the Examiner

UNITED STATES PATENTS 2,931,791   4/1960   Ernst et al. _____ 260—93.1

JOSEPH L. SCHOFER, *Primary Examiner.*

L. EDELMAN, *Assistant Examiner.*